United States Patent [19]
Barre et al.

[11] 3,799,663
[45] Mar. 26, 1974

[54] ULTRAMICROFICHE VIEWER HAVING IMAGE LOCATING SCALE SYSTEM

[75] Inventors: Sheridan F. Barre, Torrance; Tirey C. Abbott, Jr., Manhattan Beach; Stephen P. Terry, Marina Del Rey, all of Calif.

[73] Assignee: UMF Systems Incorporated, Los Angeles, Calif.

[22] Filed: May 22, 1972

[21] Appl. No.: 255,712

[52] U.S. Cl. ................................ 353/27, 353/120
[51] Int. Cl. ........................................ G03b 23/08
[58] Field of Search ..................... 353/27, 74, 78

[56] References Cited
UNITED STATES PATENTS
2,284,776  6/1942  Stuart ............................. 353/27
3,117,491  1/1964  Stern .............................. 353/27

OTHER PUBLICATIONS
IBM Technical Disclosure, C. J. Morey, Vol. 12, No. 3, August 1969 – Microfiche Grid Index Arrangement.

Primary Examiner—Samuel B. Rothberg
Assistant Examiner—A. Jason Mirabito
Attorney, Agent, or Firm—Harris, Kern, Wallen & Tinsley

[57] ABSTRACT

An ultramicrofiche reader or viewer including an axially movable and rotatable transparent drum carrying a fiche having information thereon in perpendicular arrays one extending circumferentially of the drum and the other longitudinally thereof. The fiche is provided with an integral, primary scale thereon extending circumferentially of the drum and corresponding to the circumferentially extending information array. Superimposed on the drum and extending longitudinally thereof is an external, secondary scale corresponding to the longitudinally extending information array. The scales have cooperating indicia thereon for positioning desired information on the fiche in a predetermined location, in response to rotational and longitudinal movement of the drum. A light source within the drum at the predetermined location illuminates the desired information, and a projection system projects this information onto a screen for reading or viewing.

10 Claims, 7 Drawing Figures

ULTRAMICROFICHE VIEWER HAVING IMAGE LOCATING SCALE SYSTEM

BACKGROUND OF INVENTION

Our invention relates in general to a fiche reader or viewer and, more particularly, to a scale means or system for locating desired information on a fiche.

As background, the invention contemplates a fiche, and, more particularly, a microfiche, or ultramicrofiche, bearing information arranged in predetermined arrays in two perpendicular directions.

While the information on the fiche may take various forms, and may be randomly arranged, the invention is especially applicable to and will be considered herein in connection with a fiche having thereon sequentially arranged information comprising groups of character combinations with the character combinations in each group having therein a reference series of the same two or more characters. The groups of character combinations are arranged on the fiche with corresponding characters in the reference series varying in one direction, and with other corresponding characters in the reference series varying in another, perpendicular direction. The characters may be numerals, letters, or any other symbols.

Still more specifically, the invention is particularly applicable to, and will be considered herein in connection with, a fiche bearing positive or negative serial number information. For example, the fiche may list the serial numbers of accounts, credit cards, or the like, which should not be honored for one reason or another. With present techniques, a 3 inch by 6 inch fiche can bear as many as 500,000 such serial numbers, arranged, for example, in 100 columns and 5,000 lines or rows.

The serial numbers are arranged on the fiche in groups with the numbers in each group having therein a reference series of the same two or more digits. The groups of numbers are further arranged on the fiche with certain digits in the reference series increasing in one direction, and with the other digits in the reference series increasing in another direction perpendicular to the first.

OBJECTS AND SUMMARY OF INVENTION

With the foregoing as background, the primary object of the invention is to provide means for locating a specific bit of information on the fiche quickly and easily, which bit of information may be the absence or presence of a particular credit card serial number, or the like.

A basic object of the invention is to provide a viewer, for a fiche having information arranged in perpendicular arrays, which includes an information locating scale system comprising an integral primary scale on the fiche and corresponding to one of the arrays and an external secondary scale in at least apparent register with the primary scale and corresponding to the other array. Preferably, the external scale is physically superimposed on the primary scale.

As will be discussed in detail hereinafter, the foregoing combination of an integral scale and an external scale has various important advantages, not the least of which is minimizing viewer size.

Another basic object of the invention is to provide a fiche viewer which includes, and the invention may be summarized as including: a fiche having thereon information arranged in predetermined arrays in two perpendicular directions; the fiche having a primary scale thereon corresponding to one of the arrays; a secondary, external scale in at least apparent register with the primary scale and corresponding to the other of the arrays; cooperating indicia means on the scales for positioning desired information on the fiche in a predetermined location, in response to relative movement of the fiche and the secondary scale in the specified directions; means for relatively moving the fiche and the secondary scale in the directions mentioned; a screen; and means at the predetermined location for projecting the desired information from the fiche onto the screen.

More particularly, the invention may be further summarized as including, and an important object is to provide a fiche viewer which includes: a fiche having thereon groups of character combinations with the character combinations in each group having therein a reference series of the same two or more characters; the groups of character combinations being arranged on the fiche with certain characters in the reference series varying in one direction; the groups of character combinations further being arranged on the fiche with other characters in the reference series varying in another direction perpendicular to the first direction; the fiche having a primary scale thereon corresponding to said certain characters in the reference series and also varying in the first direction; a secondary, external scale superimposed on the fiche and corresponding to said other characters in the reference series and varying in the other direction; cooperating indicia means on the scales for positioning desired character combinations on the fiche in a predetermined location, in response to relative movement of the fiche and the secondary scale in the directions; means for relatively moving the fiche and the secondary scale in the directions; a screen; and means at the predetermined location for projecting the desired character combinations from the fiche onto the screen.

Still more particularly, another important object is to provide a fiche viewer which includes, and the invention may be still further summarized as including: a fiche having thereon groups of numbers with the numbers in each group having therein a reference series of the same two or more digits; the groups of numbers being arranged on the fiche with certain digits in the reference series varying in one direction; the groups of numbers further being arranged on the fiche with other digits in the reference series varying in another direction perpendicular to the first direction; the fiche having a primary scale thereon corresponding to said certain digits in the reference series and also varying in the first direction; a secondary, external scale superimposed relative to the primary scale and corresponding to said other digits in the reference series and varying in the other direction; cooperating indicia means on the scales for positioning desired numbers on the fiche in a predetermined location, in response to relative movement of the fiche and the secondary scale in the directions; means for relatively moving the fiche and the secondary scale in the directions; a screen; and means at the predetermined location for projecting the desired numbers from the fiche onto the screen.

Yet another important object of the invention is to provide a fiche viewer of the foregoing nature which includes an axially movable and rotatable transparent drum carrying the fiche, with the primary scale on the fiche extending circumferentially of the drum, and with the secondary scale extending longitudinally of the drum. With this construction, the scales cooperate to locate the desired information on the fiche in response to axial and/or rotational movement of the drum.

A further object is to provide a fiche viewer having the foregoing characteristics wherein the projection system includes a light source within the drum for illuminating the desired information so that it can be projected onto the screen.

The foregoing objects, advantages, features and results of the present invention, together with various other objects, advantages, features and results thereof which will be pointed out hereinafter or which will be evident to those skilled in the fiche viewer or reader art in the light of this disclosure, may be achieved with the exemplary embodiments of the invention illustrated in the accompanying drawings and described in detail hereinafter.

DETAILED DESCRIPTION OF EXEMPLARY EMBODIMENTS OF INVENTION

While, as previously indicated, the present invention may utilize a fiche having any desired information thereon in perpendicular arrays, the invention will, for convenience, be considered herein in connection with fiches wherein the information comprises credit card serial numbers arranged in perpendicular sequences, the serial numbers being those of credit cards which are no longer valid for some reason. However, it will be understood that the present invention is applicable to any information which may be arranged in perpendicular arrays, sequential or otherwise. More particularly, the invention is applicable to any system of characters or character combinations capable of being arranged in perpendicular arrays, and such characters may be any suitable symbols, including numerals, letters, and the like.

Figure 1:
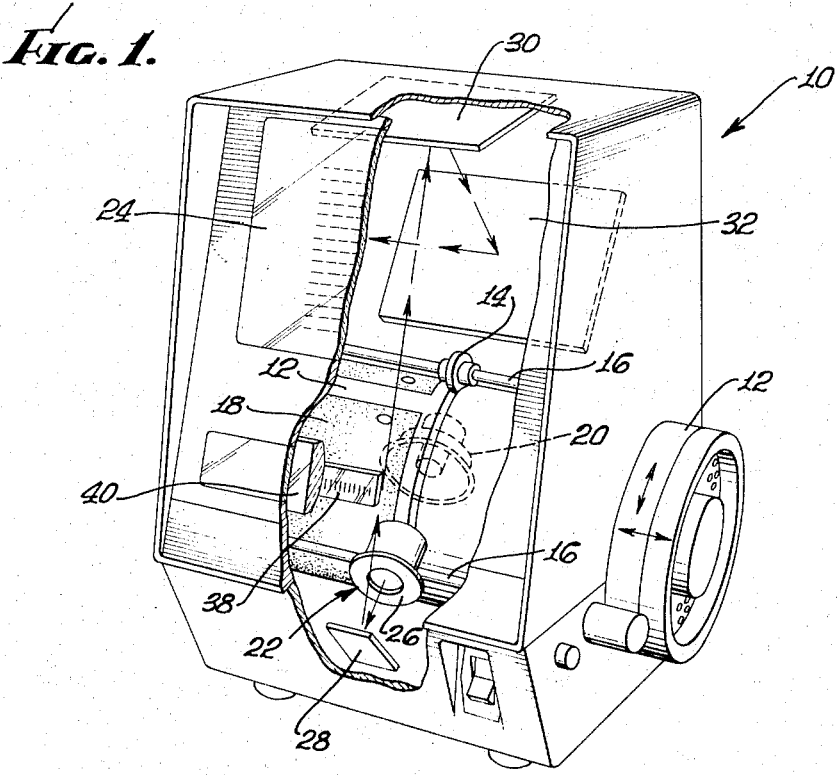
FIG. 1 is a perspective view, with parts broken away, of an ultramicrofiche viewer or reader which embodies the invention.

Referring initially to FIG. 1 of the drawings, illustrated somewhat diagrammatically therein is a fiche reader or viewer 10 of the invention which includes an axially movable and rotatable, transparent drum 12. This drum may be mounted for axial movement and rotation in any suitable manner. For example, it may be carried by wheels 14 (only one of which is visible) rotatable on and slidable longitudinally of circumferentially spaced rods 16 paralleling the axis of the drum 12.

Suitably mounted on the drum 12, preferably externally thereof, is an ultramicrofiche 18 which, as will be described, bears perpendicularly arranged sequences of credit card serial numbers, one sequence extending circumferentially of the drum and the other longitudinally thereof. (While, for convenience, this disclosure is limited to one fiche 18 on the drum 12, it will be understood that there may be more than one, each bearing different information.)

Within the drum 12 is a light source 20 which illuminates a particular portion of the fiche 18 when such portion has been positioned at a particular location by axial and/or rotational movement of the drum 12. A projection means or system 22 magnifies the desired portion of the fiche 18 and projects it onto a viewing screen 24 at the front of the viewer 10. The projection system 22 may include various elements, such as a magnifying lens assembly 26 and mirrors 28, 30 and 32. The projection system 22 magnifies the characters on the fiche 18 to approximately their original size, the magnification factor being in the range of, for example, 40 to 200.

Figure 2:
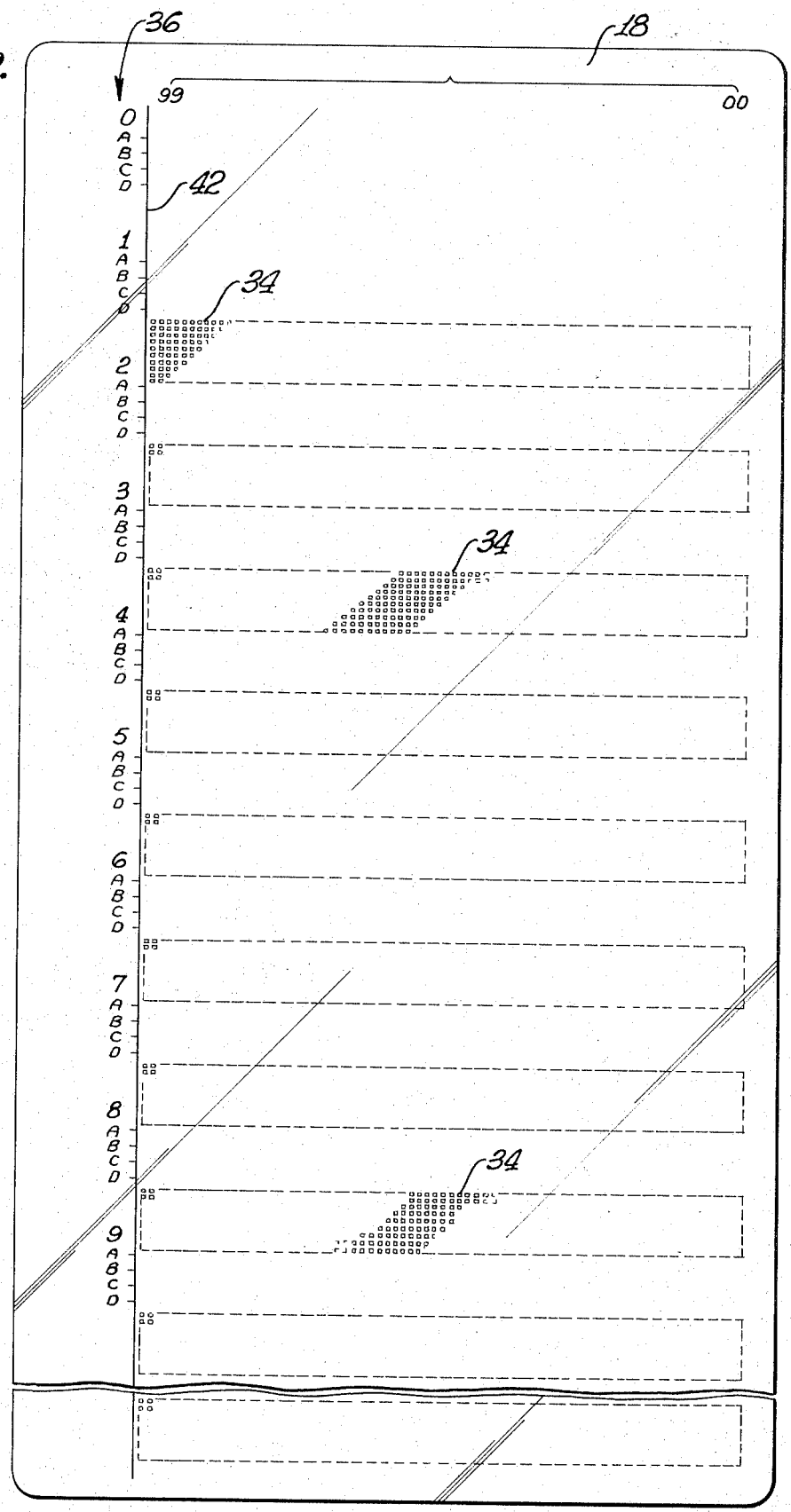
FIG. 2 is a developed view of a fiche embodying the invention.

Turning to FIG. 2, the particular fiche 18 illustrated therein bears groups 34 of numbers, such as credit card serial numbers, with the numbers in each group having therein a reference series of the same three digits. For example, the particular group 34 appearing on the screen 24 in FIG. 4 consists of serial numbers each having the reference series "388" therein. In the particular fiche 18 illustrated, each number group 34 is further broken down into subgroups identified by the characters A, B, C and D, corresponding to different credit card issuers. However, such subgrouping is not essential to the invention.

The reference series in the number groups 34 are arranged in perpendicular sequences on the fiche 18. More particularly, in the particular fiche under consideration, the first digits in the reference series increase downwardly from "0" to "9," i.e., they increase circumferentially of the drum 12 from "0" to "9." The second and third digits in the reference series increase, in the particular fiche 18 illustrated, from right to left from "00" to "99," this sequence being perpendicular to the sequence of the first digits in the reference series.

As will be apparent, with the foregoing arrangement of the reference series in the groups 34 of credit card serial numbers, the reference series range from "000" to "999," with the reference series "000" being in the upper right corner of the fiche, in its developed condition of FIG. 2, and the reference series "999" being in the lower left corner.

On the fiche 18 is an integral, primary scale 36 bearing the indicia "0" to "9." While the primary scale 36 is preferably integral in the sense that it is actually formed right on the fiche 18, it may also be integral in the sense that it is a separate scale suitable fixed relative to the fiche. In the particular fiche 18 under consideration, the primary scale 36 corresponds to the first digits in the reference series, although, as will be explained, it may correspond to other digits, such as the third digits in the reference series.

The viewer 10 includes an external, secondary scale 38 which is visible from the front of the viewer through a magnifying lens 40. The secondary scale 38 is superimposed on the fiche 18 and is as close to the fiche as possible to minimize parallax. The secondary scale 38 is transparent so that, as will be clear from FIG. 3, the primary scale 36 is visible therethrough. The primary scale is provided with a reference line 42, extending circumferentially of the drum 12, with which any indicium on the secondary scale 38 may be brought into register.

The secondary scale 38, in the particular construction under consideration, bears indicia corresponding to the second and third digits of the reference series in the groups 34 of credit card serial numbers. Thus, the secondary scale 38 bears indicia ranging from "00" to "99" from left to right. (It will be understood that if the fiche 18 bears different types of information arrays requiring different secondary scales for different portions of the fiche, the external scale 38 may have more than one set of indicia.)

Considering the operation of the viewer 10 with the particular fiche 18 on the drum 12, it will be assumed that it is desired to determine whether a "D" credit card with the serial number 17 0074 021 388 is to be honored. If this serial number does appear on the fiche 18, the credit card in question is invalid, with the particular construction disclosed.

Figure 3:
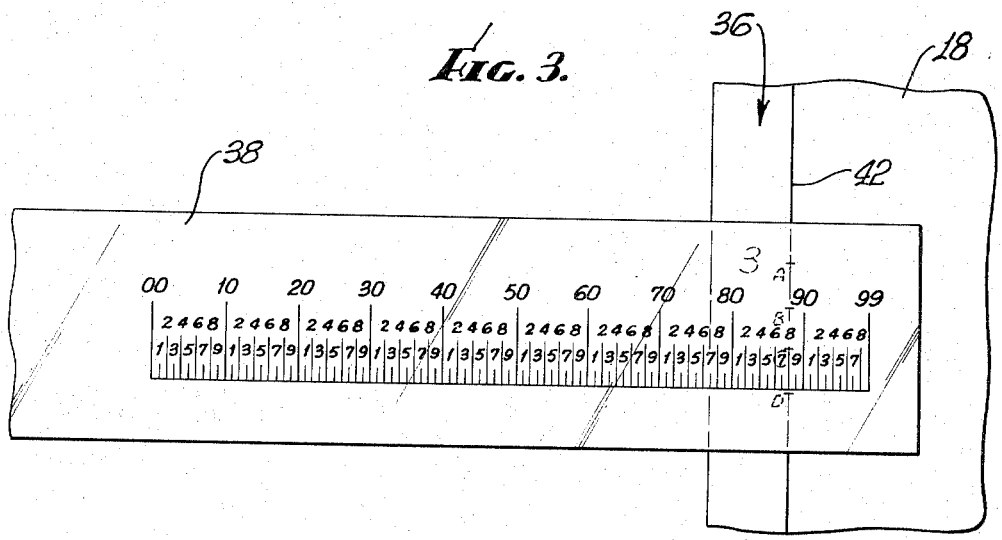
FIG. 3 is an enlarged, fragmentary view showing a scale system relationship of the invention.

First, the operator of the viewer 10 rotates the drum 12 until the indicium "3" on the primary scale 36 is visible behind the secondary scale 38, through the lens 40. Then, as shown in FIG. 3, the operator moves the drum axially until the reference line 42 of the primary scale 36 is in register with the indicium "88" on the secondary scale 38. Further rotation of the drum 12 may be necessary to bring the "D" subgroup "388" serial numbers into view on the screen 24, this condition being shown in FIG. 4. As further shown in FIG. 4, the "D" serial number mentioned previously appears on the screen, indicating that the credit card being checked should not be honored.

Thus, the viewer 10 permits any desired credit card serial number to be located readily, if it is present on the fiche 18, simply by locating the corresponding three digit reference series, utilizing the primary and secondary scales 36 and 38 in the manner indicated. The whole operation requires but a few seconds for an experienced operator of the viewer 10, which is an important feature of the invention.

Figure 5:
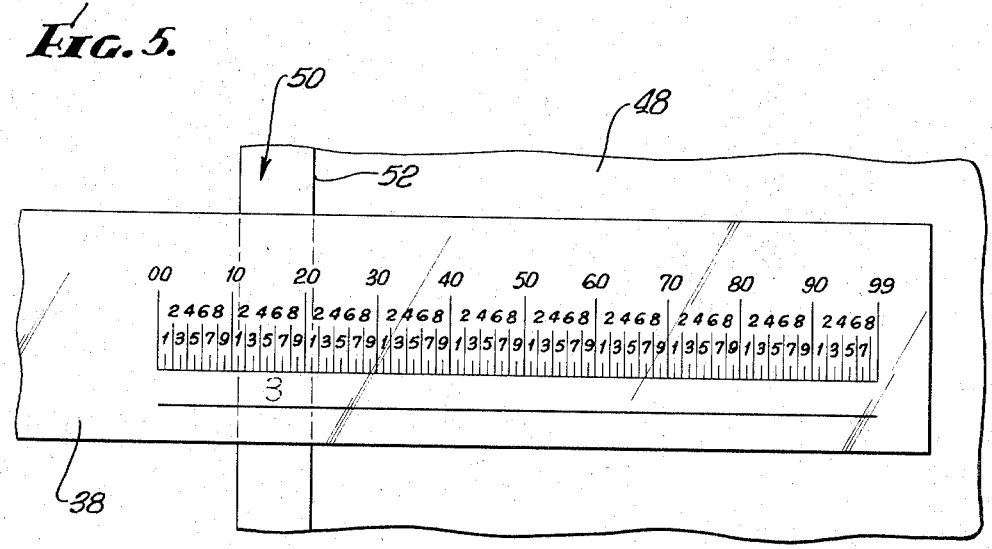
FIG. 5 is a view similar to FIG. 3, but showing another scale system relationship.
Figure 6:
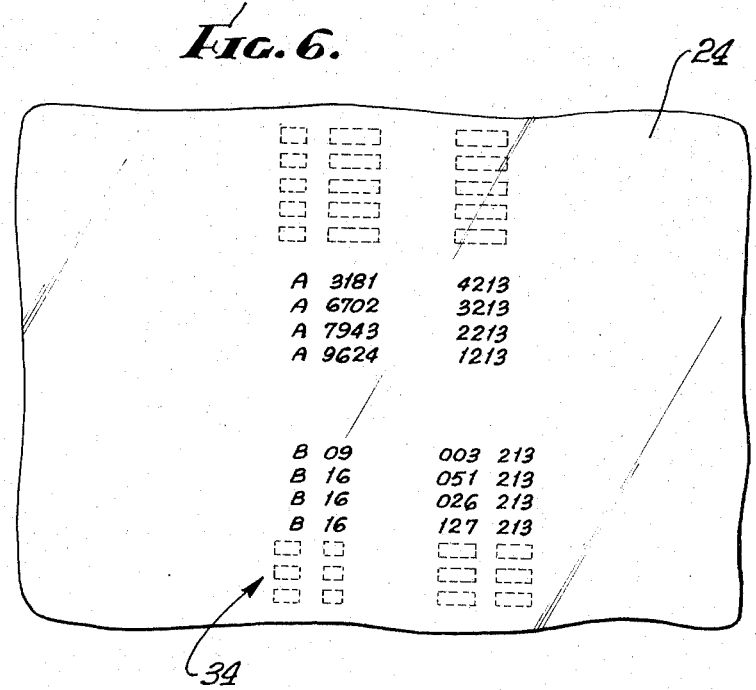
FIG. 6 is a fragmentary view showing information appearing on a screen of the viewer with the scale system relationship of FIG. 5.

Turning now to FIGS. 5 and 6, illustrated therein is a fiche 48 similar to the fiche 18 and having a similar primary scale 50 and reference line 52. In this case, the primary scale 50, instead of corresponding to the first digits of the reference series, corresponds to the last digits thereof. Also, the indicia on the secondary scale 38 corresponds to the first and second digits of the reference series in the groups of numbers on the fiche 48.

Thus, utilizing the drum position shown in FIG. 5 to illustrate, reference series comprising the numerals "213" appear on the screen 24. (With the arrangement of FIGS. 2 to 4, the reference series "321" would have appeared.)

Figure 4:
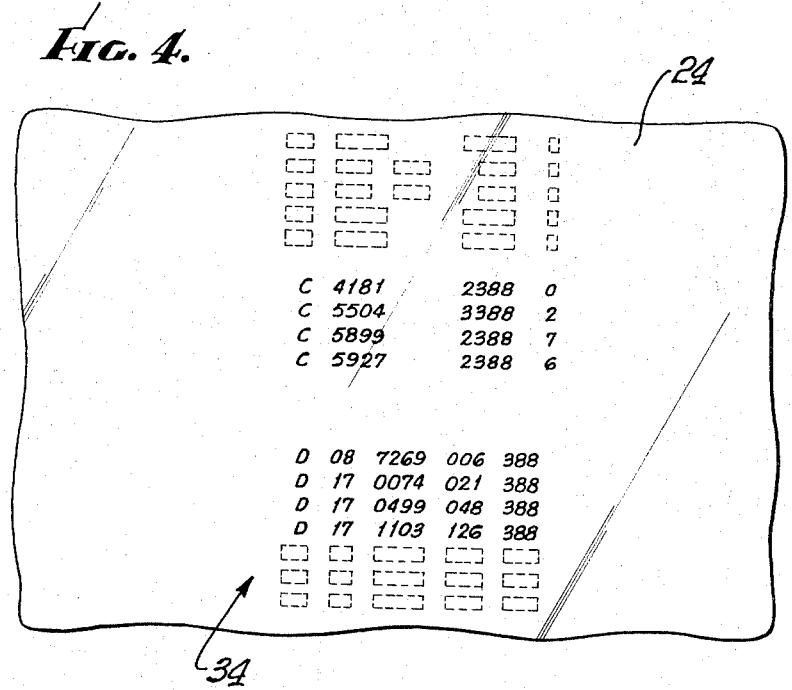
FIG. 4 is an enlarged, fragmentary view illustrating information appearing on a screen of the viewer with the scale system relationship of FIG. 3.

Either the system of FIGS. 2 to 4, or that of FIGS. 5 and 6, may be used, depending on whether it is more convenient to locate the first digit of a particular reference series first, or the first and second.

Figure 7:
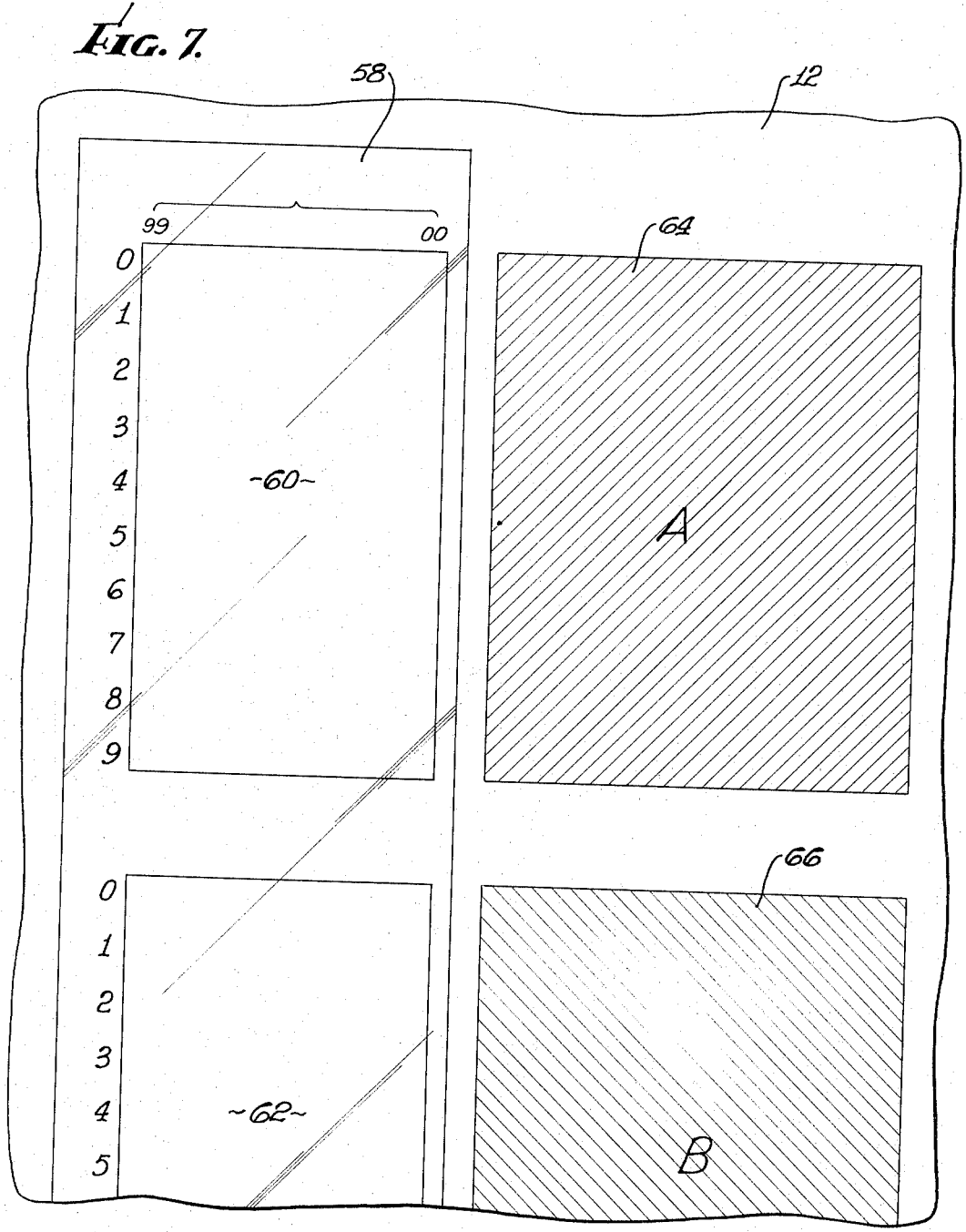
FIG. 7 is a fragmentary view showing another fiche which embodies the invention.

In FIG. 7 of the drawings is illustrated an alternative fiche 58 wherein all of the credit card serial numbers of a particular issuer are grouped together. Thus, there are, for example, an "A" group 60, a "B" group 62, and the like. Each group has its own primary scale, and the system of either FIGS. 2 to 4, or FIGS. 5 and 6, may be utilized.

Adjacent and circumferentially coextensive with the groups 60 and 62 are large "A" and "B" indicia 64 and 66. These indicia 64 and 66 may be outlined areas, distinctively different colors, or the like, and may be integral with the fiche 58, or separate therefrom. If separate, they may be mounted on the drum 12 either internally or externally.

FEATURES AND ADVANTAGES OF INVENTION

Having the primary scale 36 on the fiche 18 is important because it minimizes the effects of inaccuracies in positioning the fiche on the drum 12. As a matter of fact, the fiche position becomes relatively uncritical.

Considering another feature, in each instance, the fiche is rectangular, with its longer dimension extending circumferentially of the drum 12, and its shorter dimension longitudinally thereof. For example, the ratio of fiche length to width may be of the order of approximately two to one. With this arrangement, the external secondary scale 38 is relatively short, thereby minimizing the effects of such things as expansion or contraction due to temperature changes, humidity changes, or other factors. Thus, the relatively short external scale 38 permits accurate locating of the desired information on the fiche irrespective of variables of the type mentioned.

Considering other, more general advantages of the viewer 10, the specific combination of a primary scale integral with the fiche and extending circumferentially of the drum 12, and the external secondary scale 38 extending longitudinally of the drum, results in a viewer 10 which is smaller and less expensive than viewers utilizing other scale arrangements.

For example, it is a common practice to place both of the perpendicular scales directly on the fiche, which entails a great deal of repetition, thereby requiring a larger fiche for the same amount of information. The effect of this is to require a larger viewer. In the present invention, by having one integral scale and one external scale, the fiche size for a given amount of information, and thus the viewer size, are minimized. Not only does this result in a more compact unit, but one that is cheaper to manufacture.

It is also a common practice in the viewer art to use two external scales relative to which a pointer is moved to locate the desired bit of information, such pointer being suitably connected to the fiche to produce corresponding fiche movement relative to the projection system. Such an arrangement occupies a great deal of space and results in a very large unit. Again, the present invention, by utilizing one integral scale on the fiche, and one external scale, greatly reduces size.

Although various exemplary embodiments of the invention have been disclosed for purposes of illustration, it will be understood that various changes, modifications and substitutions may be incorporated in such embodiments without departing from the spirit of the invention as defined by the claims appearing hereinafter.

We claim as our invention:

1. In an ultramicrofiche viewer, or the like, the combination of:
   a. an ultramicrofiche having thereon information arranged in predetermined arrays in two perpendicular directions;

b. said ultramicrofiche having a primary scale thereon corresponding to one of said arrays;
c. a secondary scale externally of said ultramicrofiche and intersecting and in register with said primary scale on said ultramicrofiche and corresponding to the other of said arrays;
d. said ultramicrofiche and said secondary scale being relatively movable in said directions; and
e. viewing means for viewing all of one of said scales and a portion only of the other adjacent the intersection of said scales.

2. In an ultramicrofiche viewer, or the like, the combination of:
a. an ultramicrofiche having thereon information arranged in predetermined arrays in two perpendicular directions;
b. said ultramicrofiche having a primary scale thereon corresponding to one of said arrays;
c. a secondary scale externally of said ultramicrofiche and intersecting and superimposed on said ultramicrofiche and corresponding to the other of said arrays;
d. said scales having cooperating means thereon for positioning desired information on said ultramicrofiche in a predetermined location, in response to relative movement of said ultramicrofiche and said secondary scale in said directions;
e. means for relatively moving said ultramicrofiche and said secondary scale in said directions;
f. a screen;
g. means at said predetermined location for projecting said desired information from said ultramicrofiche onto said screen; and
h. magnifying means for magnifying all of said secondary scale and a portion only of said primary scale adjacent the intersection of said scales.

3. An ultramicrofiche viewer as defined in claim 2 wherein said information in said arrays is sequential.

4. An ultramicrofiche viewer according to claim 2 including a drum rotatable and axially movable relative to said secondary scale and said projecting means, said ultramicrofiche being carried by said drum with said primary scale and said one array extending circumferentially of said drum, and with said other array extending longitudinally of said drum.

5. An ultramicrofiche viewer as set forth in claim 4 wherein the dimension of said ultramicrofiche circumferentially of said drum is large compared to its dimension longitudinally of the drum.

6. In an ultramicrofiche viewer, or the like, the combination of:
a. an ultramicrofiche having thereon groups of character combinations with the character combinations in each group having therein a reference series of the same two or more characters;
b. the groups of character combinations being arranged on said ultramicrofiche with certain characters in said reference series varying in one direction;
c. the groups of character combinations further being arranged on said ultramicrofiche with other characters in said reference series varying in another direction perpendicular to said one direction;
d. said ultramicrofiche having a primary scale thereon corresponding to said certain characters in said reference series and also varying in said one direction;
e. a secondary scale externally of said ultramicrofiche and intersecting and superimposed on said ultramicrofiche and corresponding to said other characters in said reference series and varying in said other direction;
f. said scales having cooperating means thereon for positioning desired character combinations on said ultramicrofiche in a predetermined location, in response to relative movement of said ultramicrofiche and said secondary scale in said directions;
g. means for relatively moving said ultramicrofiche and said secondary scale in said directions;
h. a screen;
i. means at said predetermined location for projecting said desired character combinations from said ultramicrofiche onto said screen; and
j. magnifying means for magnifying all of said secondary scale and a portion only of said primary scale adjacent the intersection of said scales.

7. An ultramicrofiche viewer as defined in claim 6 including a drum axially movable and rotatable relative to said secondary scale and said projection means, said ultramicrofiche being carried by said drum with said primary scale and said one direction extending circumferentially of said drum, and with said other direction extending longitudinally of said drum.

8. In an ultramicrofiche viewer, or the like, the combination of:
a. an ultramicrofiche having thereon groups of numbers with the numbers in each group having therein a reference series of the same two or more digits;
b. the groups of numbers being arranged on said ultramicrofiche with certain digits in said reference series varying in one direction;
c. the groups of numbers further being arranged on said ultramicrofiche with other digits in said reference series varying in another direction perpendicular to said one direction;
d. said ultramicrofiche having a primary scale thereon corresponding to said certain digits in said reference series and also varying in said one direction;
e. a secondary scale externally of said ultramicrofiche and intersecting and superimposed on said primary scale and corresponding to said other digits in said reference series and varying in said other direction;
f. said scales having cooperating means thereon for positioning desired numbers on said ultramicrofiche in a predetermined location, in response to relative movement of said ultramicrofiche and said secondary scale in said directions;
g. means for relatively moving said ultramicrofiche and said secondary scale in said direction;
h. a screen;
i. means at said predetermined location for projecting said desired numbers from said ultramicrofiche onto said screen; and
j. magnifying means for magnifying all of said secondary scale and a portion only of said primary scale adjacent the intersection of said scales.

9. An ultramicrofiche viewer as defined in claim 8 including a drum axially movable and rotatable relative to said secondary scale and said projection means, said ultramicrofiche being carried by said drum with said primary scale and said one direction extending circumferentially of said drum, and with said other direction extending longitudinally of said drum.

10. An ultramicrofiche viewer according to claim 9 wherein:
 a. said certain digits in said reference series range from "0" to "9";
 b. said primary scale also ranges from "0" to "9";
 c. there are three digits in said reference series;
 d. said other digits in said reference series range from "00" to "99"; and
 e. said secondary scale also ranges from "00" to "99".

* * * * *